(12) United States Patent
Shiozawa

(10) Patent No.: US 12,354,293 B2
(45) Date of Patent: Jul. 8, 2025

(54) CALIBRATION METHOD FOR DISTANCE MEASUREMENT DEVICE, DISTANCE MEASUREMENT DEVICE, AND STORAGE MEDIUM

(71) Applicant: CANON KABUSHIKI KAISHA, Tokyo (JP)

(72) Inventor: Takashi Shiozawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 18/333,582

(22) Filed: Jun. 13, 2023

(65) Prior Publication Data

US 2024/0020865 A1    Jan. 18, 2024

(30) Foreign Application Priority Data

Jul. 15, 2022    (JP) .................................. 2022-113984

(51) Int. Cl.
*G06T 7/55*    (2017.01)
*G06T 5/50*    (2006.01)
(Continued)

(52) U.S. Cl.
CPC .................. *G06T 7/55* (2017.01); *G06T 5/80* (2024.01); *G06T 7/80* (2017.01); *G06T 2207/10028* (2013.01)

(58) Field of Classification Search
CPC .... G06T 7/97; G06T 7/55; G06T 7/80; G06T 7/85; G06T 2207/10028;
(Continued)

(56) References Cited

U.S. PATENT DOCUMENTS 8,090,195 B2 * 1/2012 Oyama .................. G01C 3/085
348/42
8,400,505 B2 * 3/2013 Oyama .................. G01C 25/00
348/188
(Continued)

FOREIGN PATENT DOCUMENTS

EP    2818826 A1    12/2014
EP    3114430 A1    1/2017
JP    2019-68272 A    4/2019

OTHER PUBLICATIONS

Extended European Search Report issued by the European Patent Office on Dec. 4, 2023 in corresponding EP Patent Application No. 23179780.4.

*Primary Examiner* — Brian P Yenke
(74) *Attorney, Agent, or Firm* — Carter, DeLuca & Farrell LLP

(57) ABSTRACT

A calibration method for a distance measurement device that is mounted inside a moving body, images outside of the moving body without intervention of a transparent body, and calculates a distance to an object by using disparity between images captured from at least two points of view, the method including: a first process of capturing a first-image-for-calibration and a second-image-for-calibration at different distances between a first-object-for-calibration and the distance measurement device without intervention of the transparent body and calculating correction information for converting disparity information calculated from image information of each of the first-image-for-calibration and the second-image-for-calibration into distance information; and a second process of capturing a third-image-for-calibration from a second-object-for-calibration that is located at least at one distance via the transparent body and modifying the correction information calculated in the first process on the
(Continued)

basis of image information of at least the captured third-image-for-calibration.

9 Claims, 15 Drawing Sheets

(51) Int. Cl.
    *G06T 5/80* (2024.01)
    *G06T 7/80* (2017.01)

(58) Field of Classification Search
    CPC ........ G06T 2207/20228; H04N 13/271; H04N 13/2013; H04N 13/0081; G01C 3/085
    See application file for complete search history.

(56) References Cited

U.S. PATENT DOCUMENTS

| | | | |
|---|---|---|---|
| 9,866,819 B2* | 1/2018 | Suzuki | G01C 3/08 |
| 10,602,050 B2* | 3/2020 | Hamano | H04N 23/673 |
| 11,909,944 B1* | 2/2024 | Uhlig | H04N 23/815 |
| 11,973,921 B2* | 4/2024 | Oko | G06T 5/50 |
| 12,069,234 B2* | 8/2024 | Oigawa | G01S 7/4814 |
| 2013/0147922 A1* | 6/2013 | Nanri | G06T 7/97 |
| | | | 348/46 |
| 2017/0070725 A1* | 3/2017 | Kishiwada | G06T 7/85 |
| 2017/0322048 A1* | 11/2017 | Yoshida | G01C 3/08 |
| 2018/0367772 A1* | 12/2018 | Nobayashi | H04N 9/646 |
| 2020/0077032 A1* | 3/2020 | Hamano | H04N 23/64 |
| 2020/0079368 A1* | 3/2020 | Yamada | G08G 1/166 |
| 2020/0366882 A1* | 11/2020 | Okuzawa | H04N 23/80 |
| 2021/0329211 A1* | 10/2021 | Coombs | G06T 5/70 |
| 2022/0116532 A1* | 4/2022 | Sambongi | G03B 13/36 |
| 2022/0250624 A1* | 8/2022 | Park | G06T 7/30 |
| 2022/0309776 A1* | 9/2022 | Fechner | G06T 7/85 |
| 2022/0321871 A1* | 10/2022 | Oigawa | G06T 7/55 |
| 2022/0392092 A1* | 12/2022 | Komatsu | G06T 7/11 |
| 2023/0199163 A1* | 6/2023 | Xie | H04N 13/271 |
| | | | 382/154 |
| 2023/0281765 A1* | 9/2023 | Oko | G06T 5/50 |
| | | | 382/106 |
| 2023/0300474 A1* | 9/2023 | Nishida | H04N 23/80 |
| | | | 348/207.99 |
| 2024/0054678 A1* | 2/2024 | Lasaruk | G06T 7/80 |

* cited by examiner

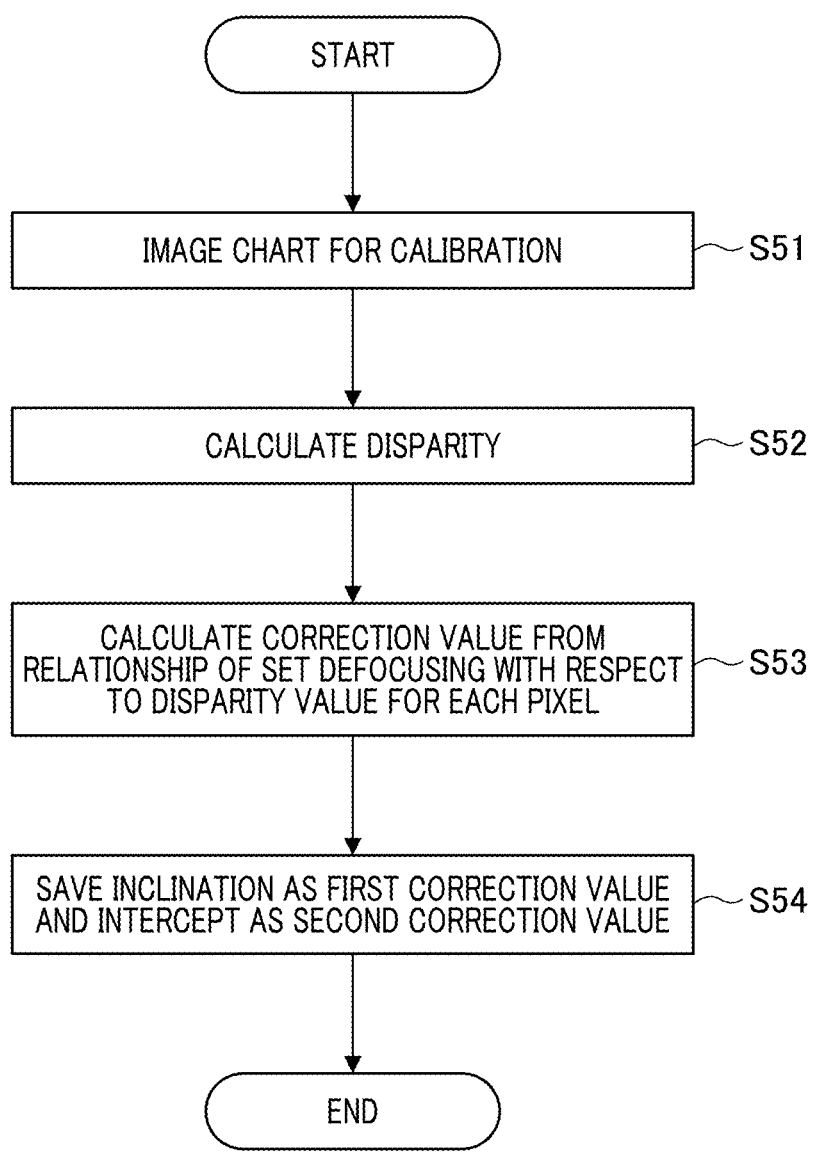

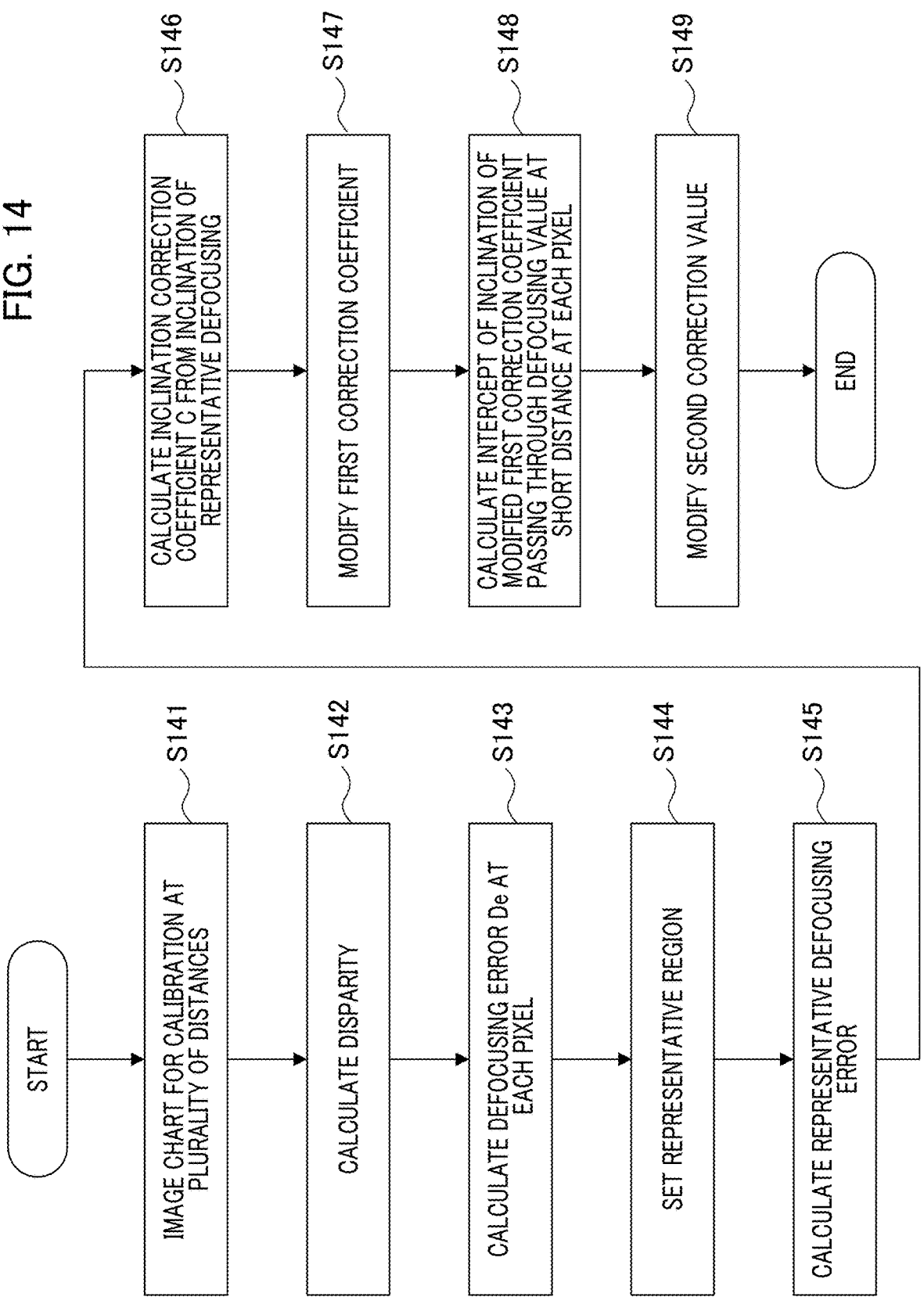

CALIBRATION METHOD FOR DISTANCE MEASUREMENT DEVICE, DISTANCE MEASUREMENT DEVICE, AND STORAGE MEDIUM

BACKGROUND OF THE INVENTION

Field of the Invention

The present invention relates to a calibration method for a distance measurement device, a distance measurement device, and a storage medium.

Description of the Related Art

A technology of mounting a camera (hereinafter, referred to as a distance measurement camera) capable of acquiring depth information on the basis of a stereo distance measurement method, an imaging plane phase difference distance measurement method, or the like in a vehicle such as an automobile, measuring a distance to an object in front of the vehicle, and controlling the vehicle on the basis of distance information has been put into practical use. Such a camera will be referred to as an in-vehicle distance measurement camera below.

Since high durability such as water resistance and dust resistance is required in a case where an in-vehicle distance measurement camera is installed outside a vehicle, the in-vehicle distance measurement camera is typically installed inside a windshield inside the automobile. Therefore, the in-vehicle distance measurement camera installed inside the automobile images conditions outside the vehicle through the windshield.

Typically, the windshield has a complicated curved surface shape and has shape distortion as compared with an optical component such as a camera lens. Therefore, influences of the distortion and the like occur in an image captured through the windshield. For this reason, it is necessary to perform calibration of the in-vehicle distance measurement camera including the windshield after it is mounted in the vehicle.

In Japanese Patent Laid-Open No. 2019-68272, calibration of an in-vehicle distance measurement camera is performed as correction of a windshield, by separately measuring distortion of a camera lens and distortion of the windshield and correcting total distortion.

Also, a distance measurement camera using an image plane phase difference distance measurement method performs calibration of the distance by correcting a relationship between the disparity amount (parallax amount) and the defocusing amount (corresponding to the measured distance) on the basis of captured images of objects for calibration set at a plurality of distances. At this time, it is possible to perform the calibration with higher accuracy by acquiring images for calibration in a wide range from a short distance to a long distance as the set distance for the objects for calibration.

However, if setting is performed such that a calibration chart appears over the entire image angle in imaging performed with an object-for-calibration located at a long distance, it is necessary to increase the size of the object-for-calibration in accordance with the installation distance, which leads to a problem that the device for performing calibration of the distance measurement camera increases in size.

SUMMARY OF THE INVENTION

A calibration method for a distance measurement device that is mounted inside a moving body, images outside of the moving body via a transparent body, and calculates a distance to an object by using disparity (parallax) between images captured from at least two points of view, the method including: a first process of capturing a first-image-for-calibration and a second-image-for-calibration at different distances between a first-object-for-calibration and the distance measurement device without intervention of the transparent body and calculating correction information for converting disparity information calculated from image information of each of the first-image-for-calibration and the second-image-for-calibration into distance information; and a second process of capturing a third-image-for-calibration from a second-object-for-calibration that is located at least at one distance via the transparent body and modifying the correction information calculated in the first process on the basis of image information of at least the captured third-image-for-calibration.

Further features of the present invention will become apparent from the following description of embodiments with reference to the attached drawings.

BRIEF DESCRIPTION OF THE DRAWINGS

FIG. 5 is a flowchart of first calibration according to the first embodiment.

FIG. 14 is a flowchart of second calibration according to a third embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

Note that an example in which the present invention is applied to an in-vehicle camera or the like as an imaging device will be described in the following embodiments. However, the imaging device includes a drone camera, a camera mounted on a robot, an electronic device including an imaging section covered with a transparent cover such as a network camera, and the like.

First Embodiment

<System Configuration>

Figure 1A:
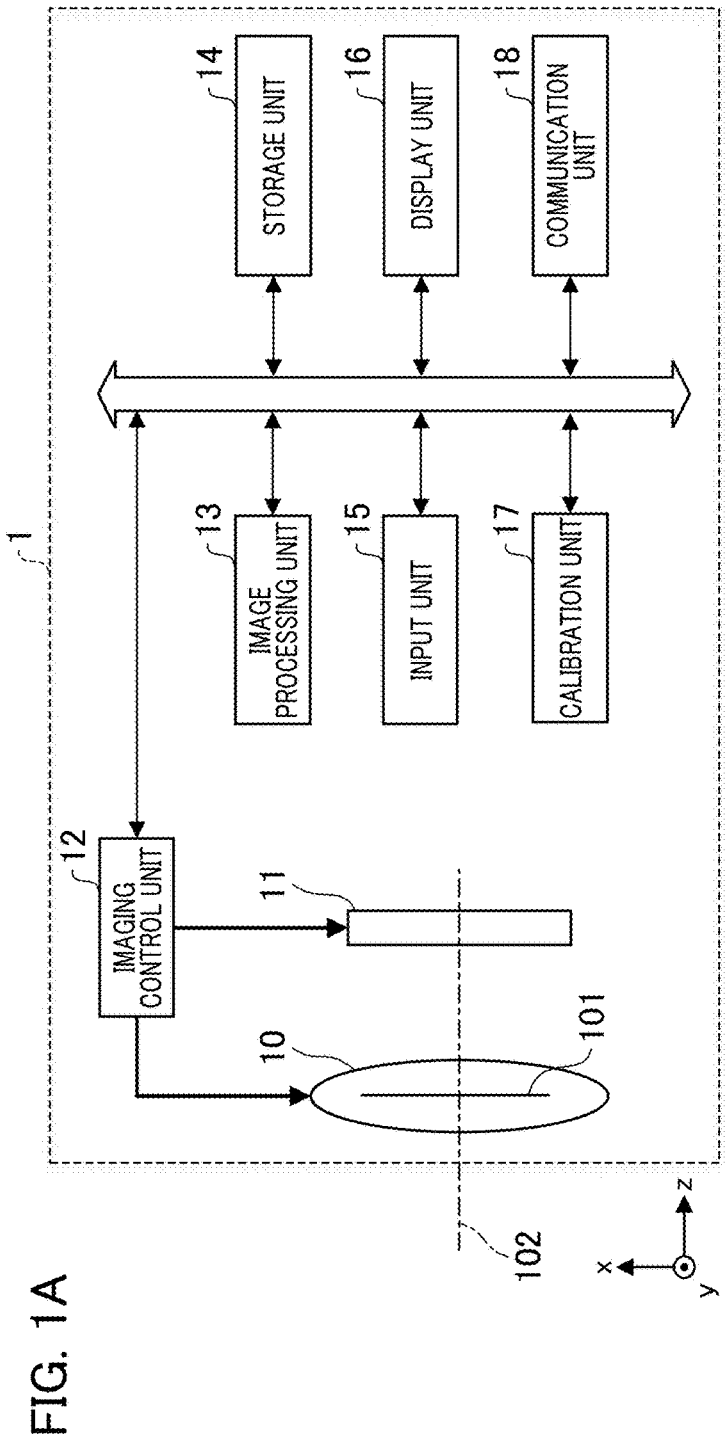
FIGS. 1A to 1C are functional block diagrams schematically illustrating a system configuration of an imaging device according to a first embodiment of the present invention.
Figure 1C:
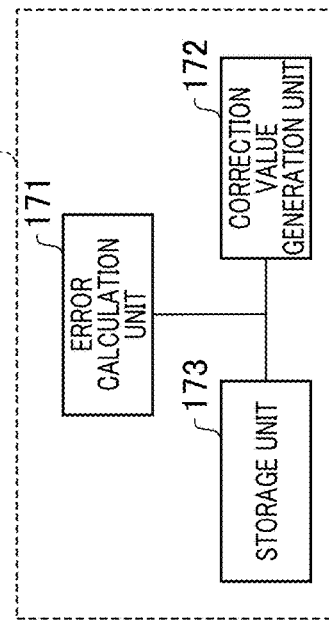
Figure 1B:
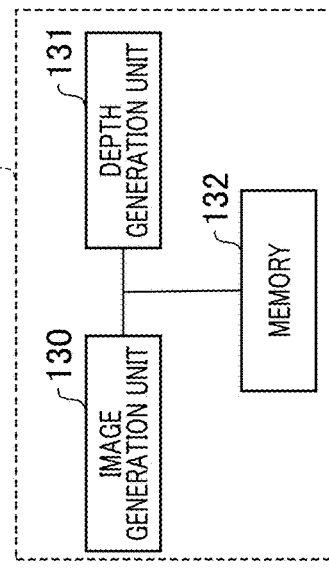

Hereinafter, a first embodiment of the present invention will be described in detail with reference to the drawings. FIGS. 1A to 1C are functional block diagrams schematically illustrating a system configuration of an imaging device according to the first embodiment of the present invention.

Note that a part of the functional blocks illustrated in FIGS. 1A to 1C is realized by causing a computer, which is included in the imaging device and is not illustrated in the drawings, to execute a computer program stored in a memory as a storage medium, which is not illustrated in the drawings. However, a part or entirety thereof may be realized by hardware. As the hardware, it is possible to use an application specific integrated circuit (ASIC), a processor (a reconfigurable processor, a DSP), or the like.

Also, each functional block illustrated in FIGS. 1A to 1C may not be incorporated in the same casing and may be configured by separate devices connected to each other via a signal line even in a case where it is surrounded by a dotted line.

As illustrated in FIG. 1A, an imaging device 1 is configured of an imaging optical system 10, an imaging element 11, an imaging control unit 12, an image processing unit 13, a storage unit 14, an input unit 15, a display unit 16, a calibration unit 17, a communication unit 18, and the like. The imaging optical system 10 is an imaging lens of the imaging device 1 and has a function of forming an object image on a light receiving plane of the imaging element 11.

Note that the imaging device 1 according to the present embodiment functions as a distance measurement device that is mounted inside a moving body such as a vehicle, images outside of the moving body via windshield that is a transparent body, and calculates a distance to an object by using disparity between images captured from at least two points of view.

The imaging optical system 10 is configured of a plurality of lenses (not illustrated) and includes an exit pupil 101 at a location separated from the imaging element 11 by a predetermined distance. Note that a z axis is assumed to be an axis that is parallel to an optical axis 102 of the imaging optical system 10 in the specification. Additionally, an x axis and a y axis are assumed to be perpendicular to each other and also perpendicular to the optical axis.

The imaging element 11 is an imaging element of a dual pixel auto focus (DAF) type, for example, configured of a charge coupled device (CCD) or a complementary metal oxide semiconductor (CMOS) and having a distance measurement function based on an imaging plane phase difference distance measurement method.

In other words, the distance measurement device according to the present embodiment is configured to perform the imaging by using the imaging element for the image plane phase difference distance measurement method. An object image formed on the imaging element 11 via the imaging optical system 10 is subjected to photoelectric conversion by the imaging element 11, and an imaging signal based on the object image is thereby generated.

In addition, the distance measurement device according to the present embodiment is possible to generate information regarding the distance from the imaging element to the object. The imaging control unit 12 includes a CPU as a computer, and the CPU functions as a control unit that controls operations of each component of the imaging device 1 by executing a computer program stored in the storage unit 14. In other words, the imaging control unit 12 performs, for example, capturing of images and controlling of the storage unit 14, the input unit 15, the display unit 16, the calibration unit 17, the communication unit 18, and the like.

As illustrated in FIG. 1B, the image processing unit 13 includes an image generation unit 130, a depth generation unit 131, and a memory 132. The image generation unit 130 performs various kinds of signal processing such as noise reduction, demosaicing, luminance signal conversion, aberration correction, white balance adjustment, and color correction on signals output from the imaging element 11.

Image data output from the image generation unit 130 is temporarily accumulated in the memory 133 and is used for image display on the display unit 16. The depth generation unit 131 generates a depth image (distance image) representing distribution of depth information by using signals acquired by a pixel for distance measurement included in the imaging element 11 as will be described later.

The image processing unit 13 can be configured by using a logic circuit. Also, the image processing unit 13 may be configured of a central processing unit (CPU) and a memory storing an arithmetic processing program in another mode. The storage unit 14 is a non-volatile storage medium storing data and intermediate data acquired by the imaging device 1, data to be used by the image processing unit 13, parameter data to be used by the imaging device 1, a computer program, and the like.

As the storage unit 14, any storage medium may be used as long as it allows high-speed reading and writing and has large capacity. For example, a flash memory or the like is preferable. The input unit 15 is an interface operated by a user to perform information input and setting change on the imaging device 1 and includes, for example, various operation switches, a keyboard, a mouse, a touch panel, and the like. The display unit 16 performs composition setting at the time of imaging and display of various setting screens and message information. The display unit 16 is configured of a liquid crystal display, an organic EL, or the like.

The calibration unit 17 includes an error calculation unit 171, a correction value generation unit 172, a storage unit 173, and the like as illustrated in FIG. 1C. The error calculation unit 171 receives the depth image (distance image) generated by the image processing unit and performs defocusing error calculation. The correction value generation unit 172 creates a correction value from an error amount calculated by the error calculation unit.

The storage unit 173 accumulates the correction value generated by the correction value generation unit and the error information calculated by the error calculation unit. The calibration unit 17 can be configured by using a logic circuit. Alternatively, the calibration unit 17 may be configured of a central processing unit (CPU) and a memory that stores an arithmetic processing program.

The communication unit 18 has a function of transmitting the captured image, the depth image, and a result of estimation, such as dimension information of the object, generated by the image processing unit 13 to another device.

Next, a configuration of the imaging element 11 will be described. The imaging element 11 is an imaging element of a DAF type having a distance measurement function based on an imaging plane phase difference distance measurement method as described above. An object image formed on the imaging element 11 via the imaging optical system 10 is subjected to photoelectric conversion by the imaging element 11, and an image signal based on the object image is thereby generated.

It is possible to generate an image for an appreciation purpose and a depth image by the image generation unit 130 performing developing processing on the acquired image signal. Also, it is possible to display the generated image for ornamental use on the display unit 16 and to transmit it to another device via the communication unit 18. Hereinafter, the imaging element 11 according to the first embodiment will be described in detail by using FIGS. 2A and 2B.

Figure 2A:
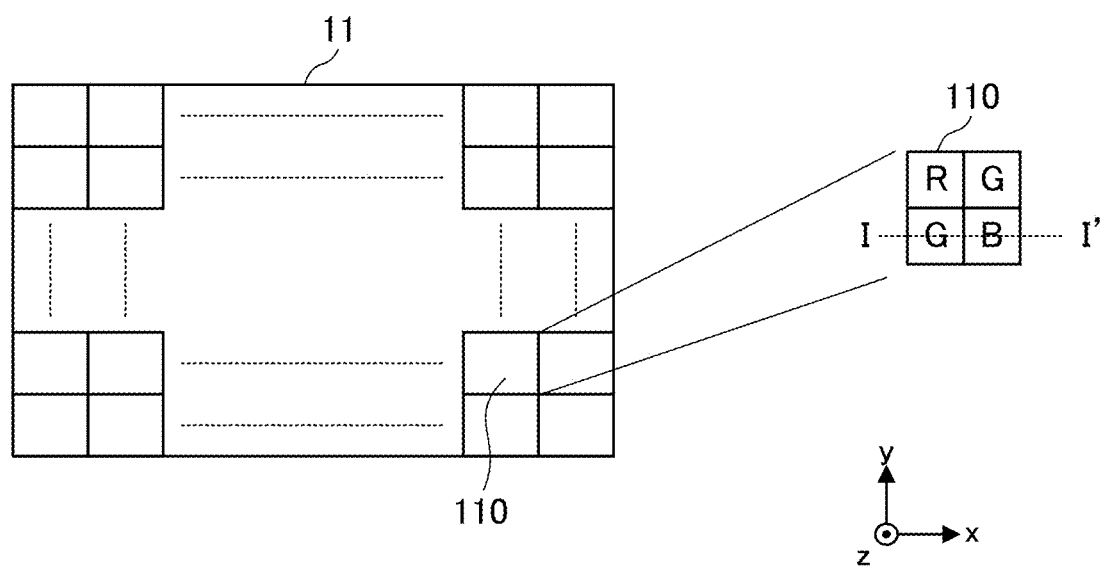
FIGS. 2A and 2B are schematic views of an image structure of an imaging element according to the first embodiment.
Figure 2B:
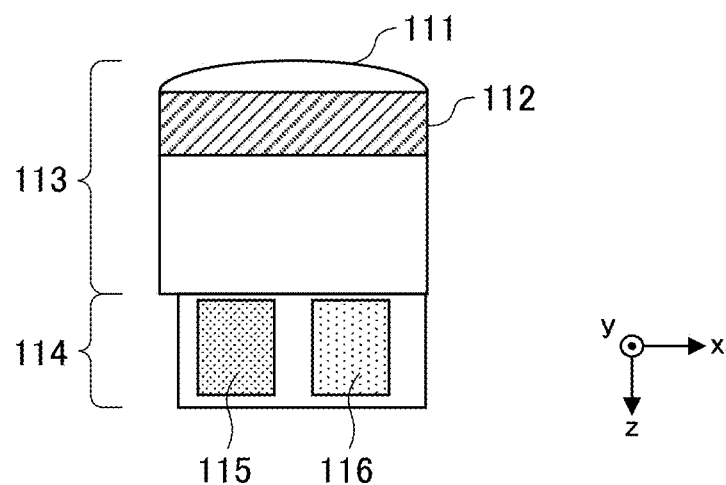

FIGS. 2A and 2B are schematic diagrams of an image structure of the imaging element according to the first embodiment, and FIG. 2A is a front view of the imaging element 11. The imaging element 11 is configured by a plurality of pixel groups 110 of 2 rows×2 columns being aligned in a two-dimensional manner. Color filters of red (R), green (G), and blue (B) are disposed in the pixel groups 110, and two G color filters are diagonally disposed in each pixel group 110.

With such disposition, it is possible to output an image signal including information of three colors R, G, and B in a separatable manner. The alignment of the color filters may be disposition other than the disposition illustrated in FIG. 2A, and the disposition is not limited. Note that each pixel is configured to be able to measure a distance and can also output a signal to be used for distance measurement along with the image signal.

FIG. 2B is a diagram schematically illustrating one pixel in the I-I' section of each pixel group 110 in FIG. 2A. Each pixel is configured of a light guiding layer 113 and a light receiving layer 114. In the light guiding layer 113, a microlens 111 for efficiently guiding a light flux that is incident on the pixel to photoelectric conversion units, one color filter 112 of any of aforementioned R, G, and B that allows light of a predetermined wavelength band to pass therethrough, wirings for image reading and for pixel driving, and the like are disposed.

In the light receiving layer 114, a pair of photoelectric conversion units (a first photoelectric conversion unit 115, a second photoelectric conversion unit 116) for photoelectrically converting received light are disposed in parallel in a horizontal scanning direction, for example, and outputs from these two photoelectric conversion units are used for distance measurement.

With such a structure, it is possible to output an image signal for ornamental use from each pixel by adding and then outputting a signal from the first photoelectric conversion unit 115 and a signal from the second photoelectric conversion unit 116. Also, it is possible to output the signal from the first photoelectric conversion unit 115 and the signal from the second photoelectric conversion unit 116 as signals for distance measurement by separating them.

Note that although it is not necessary for all the pixels to include the two photoelectric conversion units as described above, it is desirable that all the pixels have the aforementioned configuration in order to output a depth image with high density.

Next, FIGS. 3A to 3E are diagrams illustrating a distance measurement principle of the image plane phase difference distance measurement method according to the first embodiment, and light fluxes received by the first photoelectric conversion unit 115 and the second photoelectric conversion unit 116 included in the imaging element 11 according to the first embodiment will be described by using FIGS. 3A to 3E.

Figure 3A:
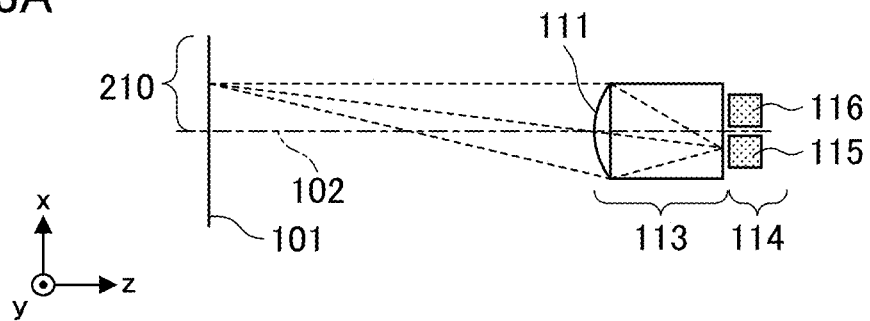
FIGS. 3A to 3E are diagrams illustrating a distance measurement principle of an imaging plane phase difference distance measurement method according to the first embodiment.
Figure 3B:
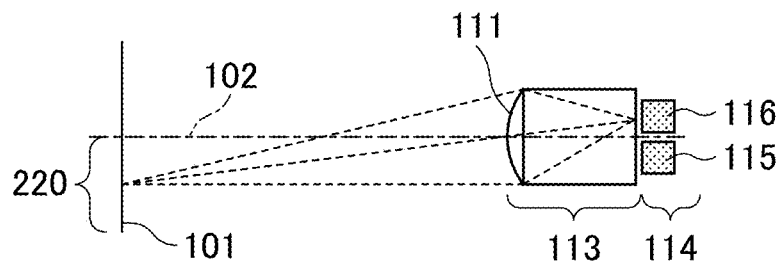

FIG. 3A is an overview diagram illustrating alight flux received by the exit pupil 101 of the imaging optical system 10 and the first photoelectric conversion unit 115 of the pixel in the imaging element 11. FIG. 3B is similarly an overview diagram illustrating a light flux received by the second photoelectric conversion unit 116.

The microlens 11 illustrated in FIGS. 3A and 3B are disposed such that the exit pupil 101 and the light receiving layer 114 are in an optically conjugate relationship. The light flux that has passed through the exit pupil 101 of the imaging optical system 10 is collected by the micro lens 111 and is then guided to the first photoelectric conversion unit 115 or the second photoelectric conversion unit 116.

At this time, the first photoelectric conversion unit 115 and the second photoelectric conversion unit 116 mainly receive the light flux that has passed through different pupil regions as illustrated in each of FIGS. 3A and 3B. In other words, the first photoelectric conversion unit 115 of each pixel receives the light flux that has passed through a first pupil region 210, and the second photoelectric conversion unit 116 receives the light flux that has passed through a second pupil region 220.

The plurality of first photoelectric conversion units 115 included in the imaging element 11 mainly receive the light flux that has passed through the first pupil region 210 and output a first image signal. Also, the plurality of second photoelectric conversion units 116 included in the imaging element 11 mainly receive the light flux that has passed through the second pupil region 220 and output a second image signal at the same time.

It is possible to obtain intensity distribution of an image formed by the light flux that has passed through the first pupil region 210 on the imaging element 11 from the first image signal. Also, it is possible to obtain intensity distribution of an image formed by the light flux that has passed through the second pupil region 220 on the imaging element 11 from the second image signal.

The amount of relative positional deviation (so-called the disparity amount) between the first image signal and the second image signal is a value in accordance with a defocusing amount. A relationship between the disparity amount and the defocusing amount will be described by using FIGS. 3C, 3D, and 3E.

Figure 3C:
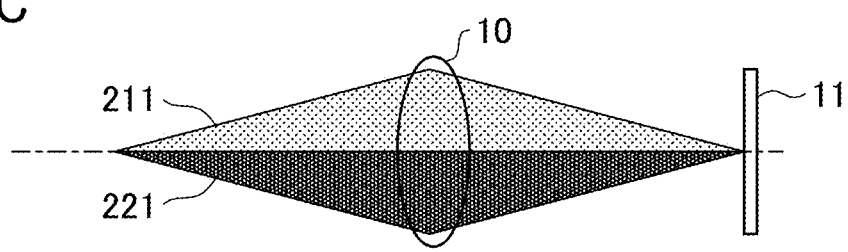
Figure 3D:
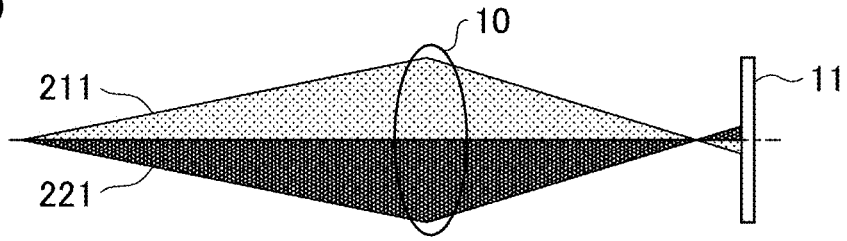
Figure 3E:
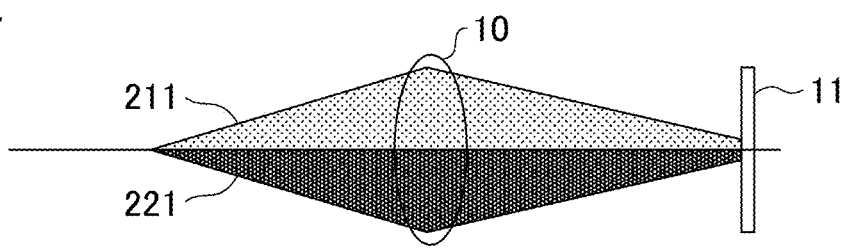

FIGS. 3C, 3D, and 3E are overview diagrams for explaining a change in relative positions of the imaging element 11 and the imaging optical system 10 according to the present embodiment. The reference sign 211 in the drawings denotes a first light flux passing through the first pupil region 210, and the reference sign 221 denotes a second light flux passing through the second pupil region 220.

FIG. 3C illustrates a state at the time of focusing, where the first light flux 211 and the second light flux 221 converge on the imaging element 11. At this time, the disparity amount between the first image signal formed by the first light flux 211 and the second image signal formed by the second light flux 221 becomes zero.

FIG. 3D illustrates a defocused state in the negative direction of the z axis on the image side. At this time, the disparity amount between the first image signal formed by the first light flux and the second image signal formed by the second signal has a negative value.

FIG. 3E illustrates a defocused state in the positive direction of the z axis on the image side. At this time, the disparity amount between the first image signal formed by the first light flux and the second image signal formed by the second light flux has a positive value. It is possible to ascertain from comparison between FIGS. 3D and 3E that the directions of positional deviation change in accordance with which of positive and negative the defocusing amount is.

Also, it is possible to ascertain that positional deviation occurs in accordance with an image forming relationship (geometric relationship) of the imaging optical system depending on the defocusing amount. The disparity amount that is positional deviation between the first image signal and the second image signal can be detected by a region-based matching method.

The disparity amount can be converted into a distance A to an object surface by the following method. First, the disparity amount can be converted into a defocusing amount that is a distance from the imaging element 11 to a focal point of the imaging optical system 10 by using a predetermined conversion coefficient. When the predetermined conversion coefficient is assumed to be BL, the defocusing amount is assumed to be D, and the disparity amount is assumed to be d, the disparity amount d can be converted into the defocusing amount D by the following (Equation 1).

$$D = BL \times d \quad \text{(Equation 1)}$$

Further, it is possible to convert the defocusing amount D into an object distance by using (Equation 2) that is a lens formula in geometric optics. However, A denotes the distance from the object surface to a main point of the imaging optical system 10, B denotes the distance from the main point of the imaging optical system 10 to the image plane, and F denotes a focal distance of the imaging optical system 10.

$$1/A + 1/B = 1/F \quad \text{(Equation 2)}$$

In (Equation 2), the value B can be calculated from the defocusing amount D, and the focal distance is saved in a memory incorporated in a lens barrel, for example, as information of the optical system and is obtained from the memory, and it is thus possible to calculate the distance A to the object surface.

Figure 4:
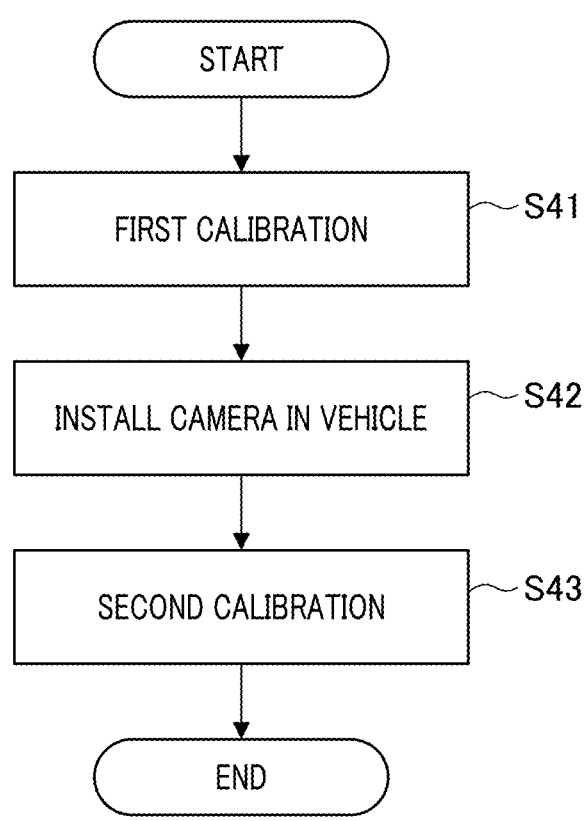
FIG. 4 is a flowchart of calibration of the imaging device according to the first embodiment.

Next, a calibration flow according to the present embodiment will be described by using FIG. 4. FIG. 4 is a flowchart of calibration of the imaging device according to the first embodiment. Note that operations in each step of the flowchart in FIG. 4 are performed by the CPU that is a computer in the imaging device executing the computer program stored in the memory.

In the first embodiment, first calibration is performed in a state where there is no windshield in front of the imaging device in Step S41. In other words, imaging of a predetermined chart is performed by the imaging device 1 and calibration is performed in the state where there are no influences of the windshield in the first calibration. Next, a state where the windshield is present in front of the imaging device is achieved by installing the imaging device 1 in a vehicle in Step S42.

Next, second calibration is performed in Step S43. In the second calibration, an image via the optical system including a windshield 80 is captured by the imaging device 1, and calibration is performed, in a state where the imaging device 1 is installed in a vehicle 70. Hereinafter, the first calibration and the second calibration will be described in order.

Next, the first calibration will be described by using the flowchart in FIG. 5 with reference to FIG. 6. FIG. 5 is a flowchart of the first calibration according to the first embodiment, and FIGS. 6A to 6C are schematic diagrams for explaining imaging of an object-for-calibration in the first calibration according to the first embodiment.

Note that operations in each step of the flowchart in FIG. 5 are performed by the CPU that is a computer in the imaging device executing the computer program stored in the memory.

In Step S51, an object-for-calibration 60 that is a first-object-for-calibration is imaged at different distances. In the first calibration, a plurality of images of the object-for-calibration 60 are captured with an object distance L changed.

Figure 6A:
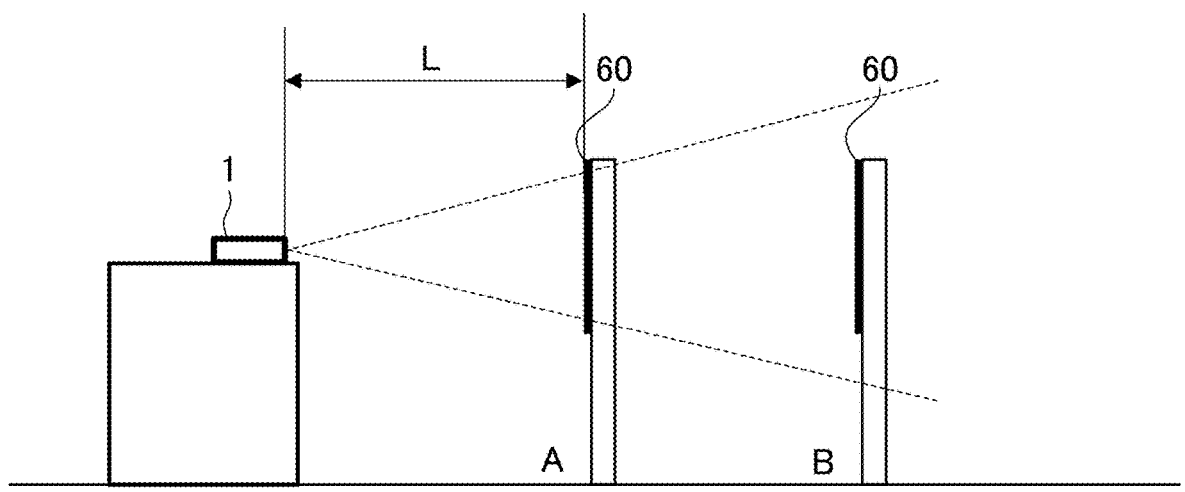
FIGS. 6A to 6C are schematic views for explaining imaging of an object-for-calibration in the first calibration according to the first embodiment.

FIG. 6A is a diagram illustrating a positional relationship between the object-for-calibration 60 and the imaging device 1. The imaging device 1 and the object-for-calibration 60 are installed to face each other, and the object distance L indicates the distance between the imaging device 1 and the object-for-calibration 60.

In this manner, the first-image-for-calibration and the second-image-for-calibration at different distances between the object-for-calibration 60 that is the first-object-for-calibration and the imaging device are captured without intervention of the windshield that is a transparent body in Step S51.

Figure 6B:
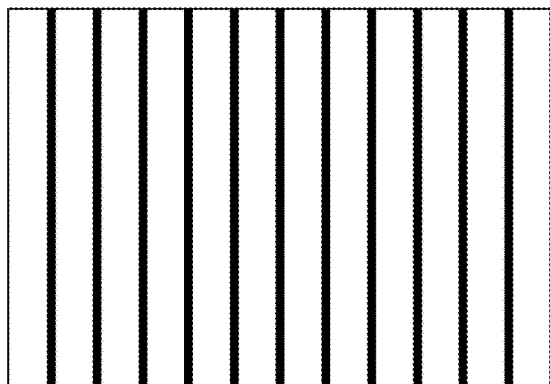
Figure 6C:
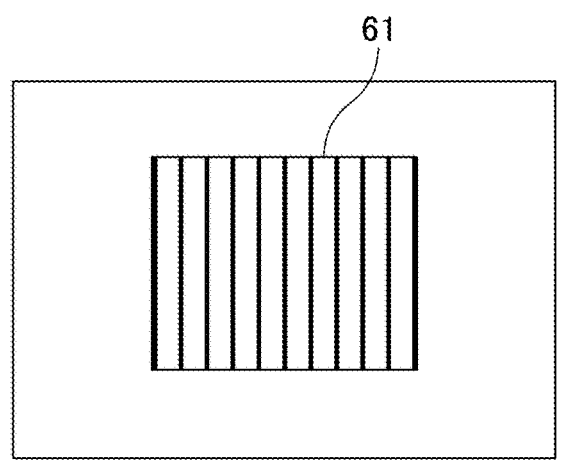

FIGS. 6B and 6C are diagrams illustrating captured images of the object-for-calibration 60 installed at a location A and a location B in FIG. 6A, respectively. In a case where the object-for-calibration 60 is installed at the location A, the object-for-calibration 60 is displayed over the entire image angle. On the other hand, the object-for-calibration 60 installed at the location B which is further is displayed only at a part of the image angle.

At this time, it is possible to obtain a disparity value (amount) over the entire image angle from the image captured at the location A. On the other hand, since the object-for-calibration 60 does not present in the periphery of the image angle in the image from the location B, any disparity amount that can be used for first calibration cannot be obtained from the periphery of the region (hereinafter, the region from which disparity images can be obtain will be referred to as an effective region 61).

In Step S52, a disparity amount as disparity information is calculated from image information of each of the first-image-for-calibration and the second-image-for-calibration that are images of the object-for-calibration 60 captured in Step S51. In the present embodiment, the object-for-calibration 60 as the first-object-for-calibration uses a vertical line chart having a stripe pattern as illustrated in FIG. 6B.

Since the disparity amount calculated by using the vertical line chart is calculated accurately only at locations where vertical lines of the captured image are present, a disparity image representing distribution of disparity values over the entire image angle is acquired by interpolating the disparity values in regions where there are no vertical lines by using the disparity values in the regions where there are vertical lines. The interpolation method used at this time may be appropriately selected from interpolation methods such as multidimensional function approximation and spline interpolation.

In Step S53, a correction value as correction information is calculated from a relationship between the disparity value as the disparity information calculated in Step S52 and designed defocusing Dd as distance information (distance equivalent information) converted into the defocusing amount corresponding to the object distance L.

Here, Steps S51 to S53 function as a first process of capturing a first-image-for-calibration and a second-image-for-calibration at different distances and calculating correction information for converting disparity information calculated from image information of each of the first-image-for-calibration and the second-image-for-calibration into distance information (distance equivalent information).

Figure 7A:
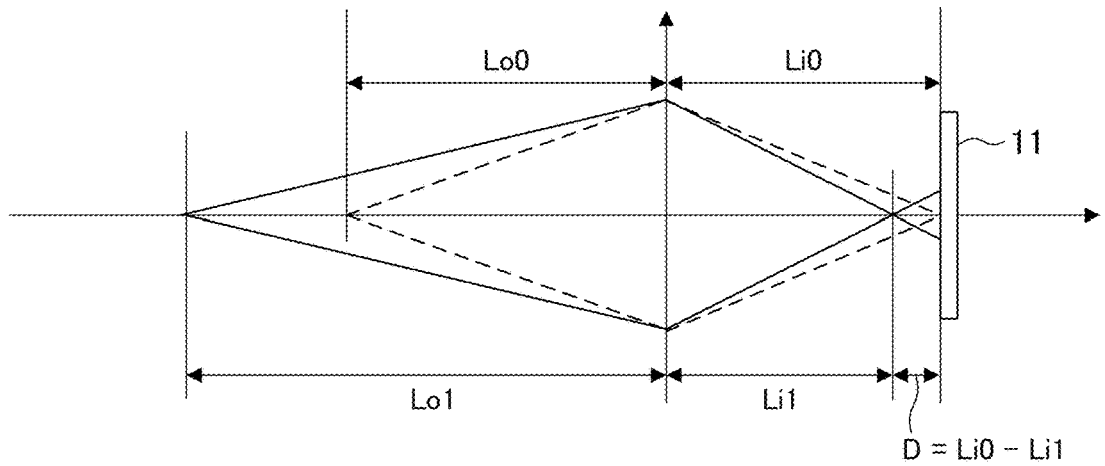
FIGS. 7A to 7D are schematic views for explaining a principle of the first calibration according to the first embodiment.

FIGS. 7A to 7D are schematic diagrams for explaining a principle of the first calibration according to the first embodiment, and FIG. 7A is a schematic diagram for explaining the designed defocusing Dd, where the dotted line and the solid line schematically illustrate the state in FIG. 2C and the state in FIG. 2D, respectively. Lo0 denotes the focusing distance of the imaging device 1 and is converted into Li0 which is a focal distance on the image plane side by using (Equation 2).

It is desirable that adjustment be made such that the imaging plane of the imaging element 11 is located at the distance Li0 in the imaging device 1. The distance Li1 indicates a case where the object is located at a distance Lo1 which is different from the focusing distance Lo0 of the imaging device 1.

The focal point on the image side at this time is similarly obtained as the distance Li1 by using (Equation 2). At this time, the designed defocusing Dd of the object at the distance Lo1 can be obtained as a difference between the distance Li0 and the distance Li1.

Figure 7B:
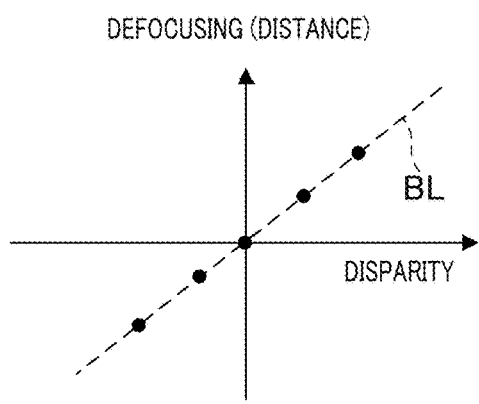

FIG. 7B is a diagram illustrating an ideal relationship between the disparity amount and the defocusing amount. This corresponds to a case where Equation 1 is illustrated, and the disparity amount and the defocusing amount are in direct proportion. However, since there are aberration of the lens such as a field curvature, an assembly error, and the like in general, the disparity amount and the defocusing amount are not in direct proportion and are in a relationship as in FIG. 7C, for example, in a case where the disparity amount calculated from the images of the object-for-calibration 60 and the designed defocusing Dd are plotted.

Figure 7C:
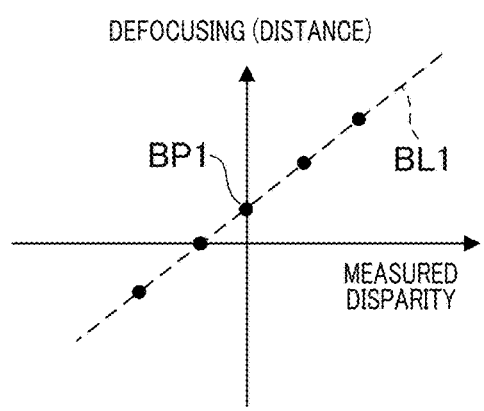

The points in FIG. 7C indicate data points at different object distances L, and approximation with a linear function as illustrated by the dotted line can be represented by (Equation 3) below.

$$Dd = BL1 \times d + BP1 \quad \text{(Equation 3)}$$

BL1 that is a first-order coefficient of (Equation 3) is assumed to be a first correction coefficient (first correction value), and BP1 that is a zeroth coefficient is assumed to be a second correction coefficient (second correction value). Here, correction information is calibrated with the first correction value and the second correction value, and it is possible to convert the calculated disparity amount into an appropriate defocusing amount by using these correction coefficients.

The first correction coefficient and the second correction coefficient can be calculated by measuring Dd and d when the object distance L is changed, and it is possible to appropriately convert the disparity amount into the defocusing amount by obtaining the first correction coefficient and the second correction coefficient by each pixel within the image angle.

In this manner, according to the present embodiment, the distance measurement device converts disparity information into distance equivalent information by a linear function, the first correction value is a first-order coefficient of the linear function, and the second correction value is a zeroth-order coefficient of the linear function.

Figure 7D:
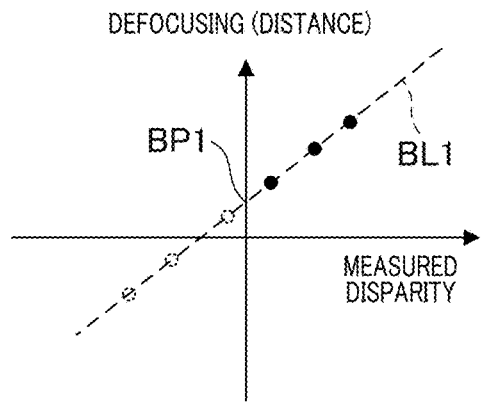

FIG. 7D is a diagram illustrating a designed defocusing relationship with respect to a disparity amount in a case where the object-for-calibration 60 does not appear in the surroundings of the image angle as illustrated in FIG. 6C. The black points are measured values corresponding to the effective region 61, and the white points represent results at further distances outside the effective region 61.

In this case, it is possible to obtain the correction coefficients only from data of the effective region 61 on the close distance side or to use an extrapolation value as the disparity amount in the surroundings by using the disparity amount at the center portion in a case where it is possible to predict how disparity error distribution appears.

The imaging optical system 10 is designed by using an optical design tool or the like in general, and it is possible to predict how an error appears by using designed data. On the other hand, since it is difficult to design an optical system including a windshield, and it is not possible to predict influences thereof, calibration accuracy may be significantly degraded in a case where calibration similar to the first calibration is carried out in a state where it is mounted in a vehicle.

Figure 8:
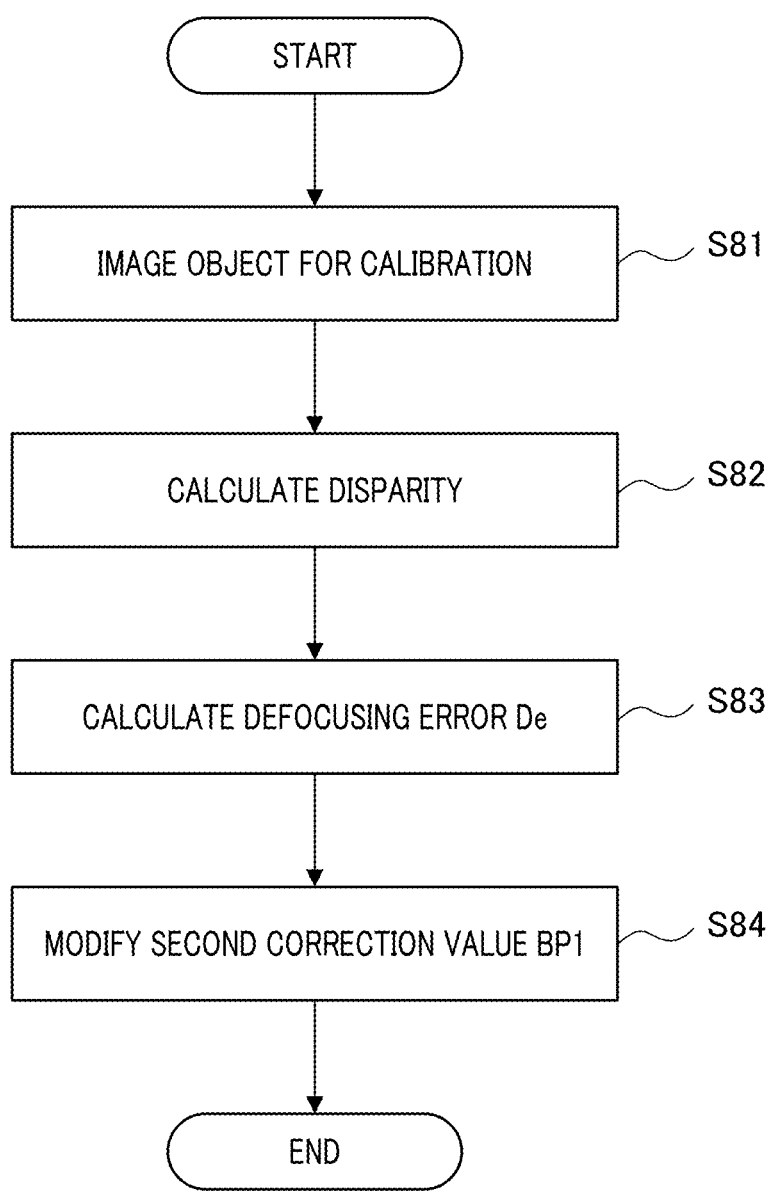
FIG. 8 is a flowchart of second calibration according to the first embodiment.

Second calibration will be described by using FIGS. 8 and 9. FIG. 8 is a flowchart of the second calibration according to the first embodiment. Note that operations in each step of the flowchart in FIG. 8 are performed by the CPU as a computer in the imaging device executing the computer program stored in the memory. FIGS. 9A and 9B are overview diagrams for explaining an imaging method in the second calibration.

Figure 9A:
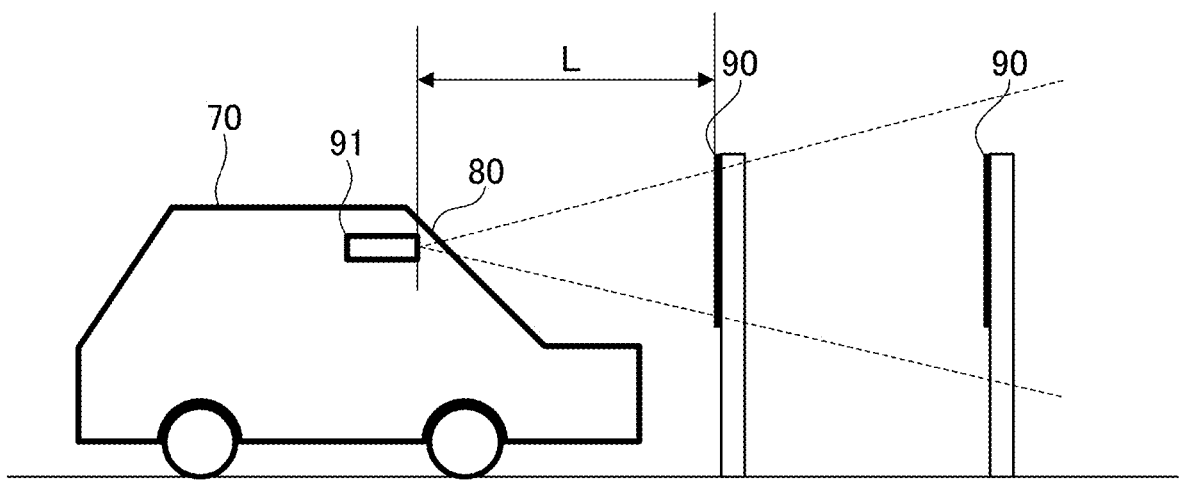
FIGS. 9A and 9B are overview diagrams for explaining an imaging method in the second calibration.

In Step S81, the CPU images an object-for-calibration 90 as a second-object-for-calibration in a state where an imaging device 91 is installed inside a vehicle 70 as illustrated in FIG. 9A. In other words, the imaging device 91 images the object-for-calibration 90 via a windshield 80 as a transparent body of the vehicle 70.

In other words, a third-image-for-calibration is captured from the second-object-for-calibration at least at one distance via a transparent body in Step S81. At this time, the object distance L is set such that the object-for-calibration 90 is located within a predetermined image angle.

Figure 9B:
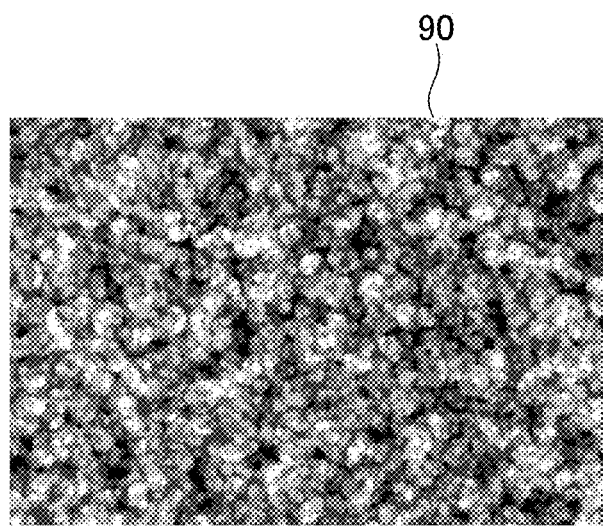

In the second calibration, the object-for-calibration 90 having a random pattern as in FIG. 9B, for example, is used as the second-object-for-calibration. It is possible to densely measure the disparity amount and to acquire detailed data even in a case where it is difficult to predict influences of the windshield, such as imaging via the windshield 80, by using the random pattern.

In this manner, the object-for-calibration 60 as the first-object-for-calibration and the object-for-calibration 90 as the second-object-for-calibration have different patterns in the present embodiment.

In Step S82, the disparity d is calculated from images obtained by imaging the object-for-calibration 90 similarly to the first calibration. The disparity amount calculated here is affected by the windshield 80, and the disparity amount changes in accordance with a degree of influences as compared with a case where there is no windshield 80.

In Step S83, the defocusing error De is calculated. The defocusing error De is obtained as a difference between a value obtained when the disparity amount is converted into the defocusing by using the first and second correction values obtained in the first calibration and the designed defocusing.

In Step S84, a defocusing error De is calculated. Also, the second correction value that is a part of correction information is modified by using the defocusing error De. Here, Steps S81 to S84 function as a second process. In the second process, the third-image-for-calibration is captured from the second-object-for-calibration at least at one distance via the transparent body, and the correction information calculated through the first process is modified on the basis of image information of at least the captured third-image-for-calibration.

At that time, a distance equivalent error value is calculated on the basis of the image information of at least the third-image-for-calibration, and the second correction value is modified on the basis of the distance equivalent error value in the first embodiment.

Figure 10A:
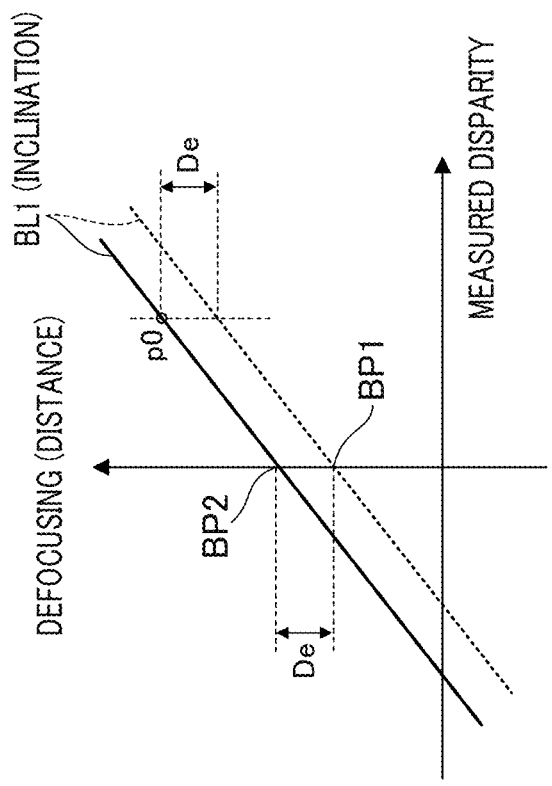
FIGS. 10A and 10B are schematic views for explaining a principle of the second calibration according to the first embodiment.
Figure 10B:
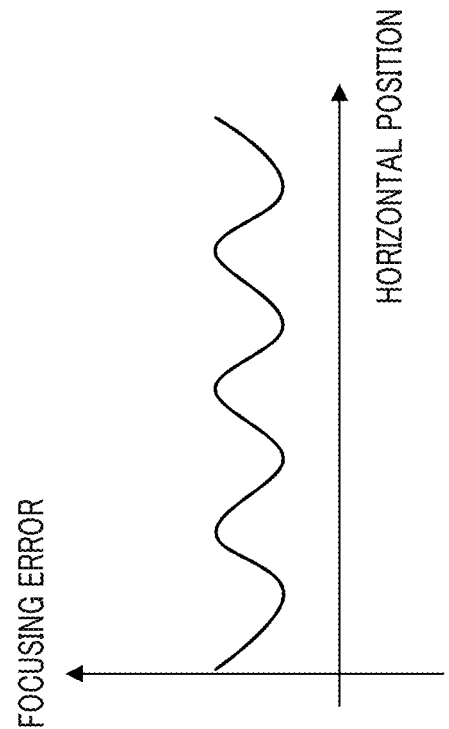

FIGS. 10A and 10B are schematic views for explaining a principle of the second calibration according to the first embodiment, and modification of the first and second correction values will be described by using FIGS. 10A and 10B. The point p0 in FIG. 10A is a point plotting the disparity amount obtained before Step S83 and the designed defocusing. The dotted line indicates a relationship between the disparity amount and the defocusing value in the first calibration represented by (Equation 3). Note that FIG. 10B is a diagram illustrating a defocusing error in the horizontal direction.

At this time, the difference between the point p0 and the dotted line indicates the defocusing error De. A case where the first correction value BL1 does not change due to influences of the windshield 80, that is, a case where the amount of change in defocusing amount with respect to the amount of change in disparity value does not change is illustrated by the solid line. As in FIG. 10A, BP2 that is an intercept of a straight line passing through the point and having an inclination BL1 is a sum of the second correction coefficient BP1 and the defocusing error De.

If the second correction value after the modification at this time is assumed to be BP2, BP2=BP1+De is satisfied. Also, if the second correction value is modified, (Equation 3) can be represented by (Equation 4) below.

$$Dd = BL1 \times d + BP1 + De \quad \text{(Equation 4)}$$

In the present embodiment, the first correction coefficient and the second correction coefficient that do not include influences of the windshield are acquired by using the images obtained by imaging the object-for-calibration disposed at different distances in the first calibration. Further, the second correction value corrects a component affected by the windshield 80 by using captured images obtained by imaging the object-for-calibration via the windshield 80 in the second calibration.

Since it is possible to calibrate the influences of the windshield 80 from the images only at short distances by performing the calibration as described above, it is possible to perform the calibration without leading to an increase in size of the calibration environment.

Second Embodiment

A second embodiment of the present invention will be described. In the second embodiment, the second correction value is modified by using images under the condition of a long object distance L as well in the second calibration. Hereinafter, a flow of processing will be described in regard to differences in the processing from that in the first embodiment.

Figure 11:
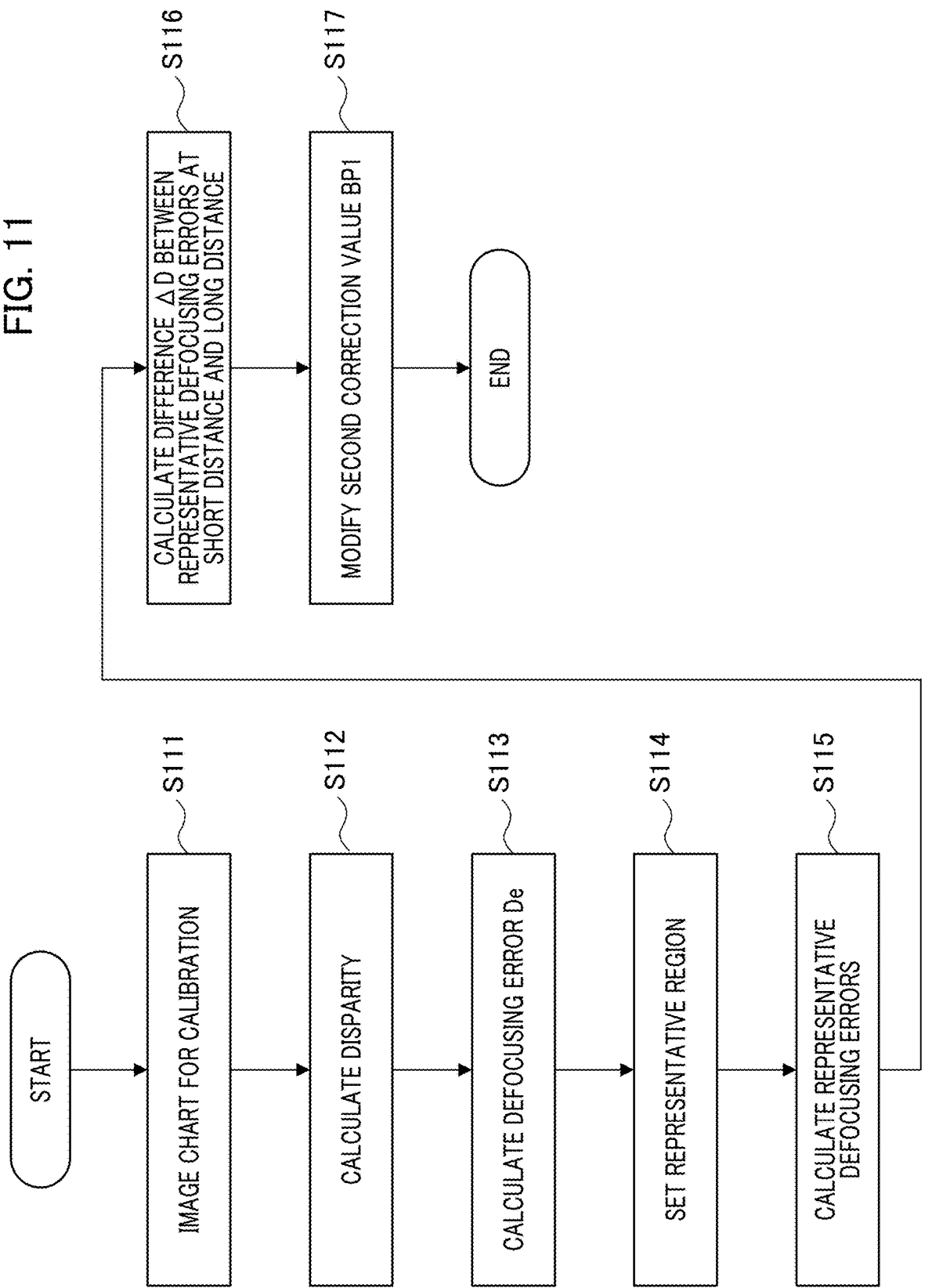
FIG. 11 is a flowchart of second calibration according to a second embodiment.

FIG. 11 is a flowchart of the second calibration according to the second embodiment. Note that operations in each step of the flowchart in FIG. 11 are performed by the CPU as a computer in the imaging device executing the computer program stored in the memory.

In Step S111, the object-for-calibration 90 is imaged similarly to the first embodiment. At that time, the object-for-calibration 90 is imaged at along object distance (hereinafter, a long-distance condition) in addition to the object distance at which the object-for-calibration 60 appears over the entire image angle to be calibrated as in the first embodiment (hereinafter, a short-distance condition).

In other words, not only a third-image-for-calibration is captured, but also the second-object-for-calibration is imaged at a distance different from that for the third-image-for-calibration, and image information of a fourth-image-for-calibration is thereby acquired.

In Step S112 and Step S113, the defocusing error De is calculated similarly to the first embodiment. Next, a representative region is set by a method as illustrated in FIGS. 12A and 12B in Step S114.

Figure 12A:
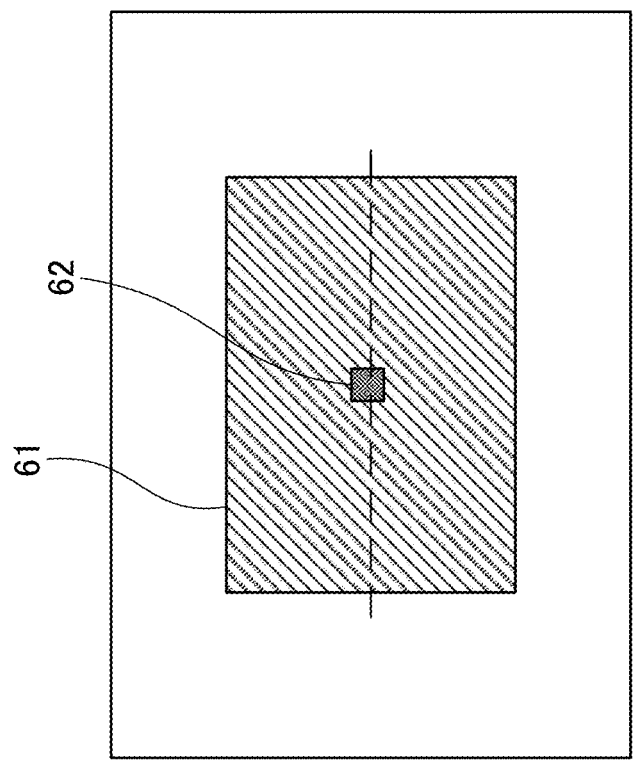
FIGS. 12A and 12B are diagrams for explaining a second representative region according to the second embodiment.
Figure 12B:
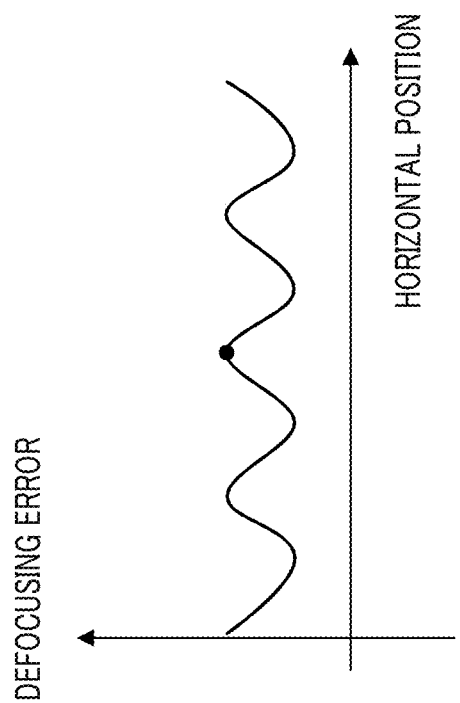

FIGS. 12A and 12B are diagrams for explaining a second representative region according to the second embodiment. FIG. 12A illustrates an image for calibration captured in Step S111. The hatched region is the effective region 61. The defocusing error De in the effective region 61 is obtained. The defocusing error on the dotted line in FIG. 12A is illustrated as a graph as in FIG. 12B.

The defocusing error has different degrees of influences of the windshield 80 depending on the horizontal position and has distribution inside the effective region 61 as in the drawing. In the second embodiment, the specific representative region 62 is chosen from the defocusing error distribution. In regard to how to choose the representative region 62, data near the central image angle that has high data reliability and is located inside the effective region 61 even if the object distance L increases is preferably used.

More preferably, it is possible to perform calibration with reliability and higher accuracy by selecting, as the effective region 61, mountain or valley parts of the distribution where the amount of change in defocusing error De is small from the viewpoint of data stability.

In Step S115, the representative defocusing error is calculated from the defocusing error De of the representative region 62. As the representative defocusing error, a value obtained by performing statistical processing (for example, an average value or the like) on the defocusing error distribution in the representative region is used.

In Step S116, a difference ΔD between the representative defocusing errors under the short-distance condition (in the case where the object-for-calibration 60 is imaged at a short distance) and the long-distance condition (in the case where the object-for-calibration 90 is imaged at a long distance) is calculated. In other words, each distance equivalent error value is calculated on the basis of image information of each of the third-image-for-calibration and the fourth-image-for-calibration, and a difference between the distance equivalent error values is calculated.

Figure 13A:
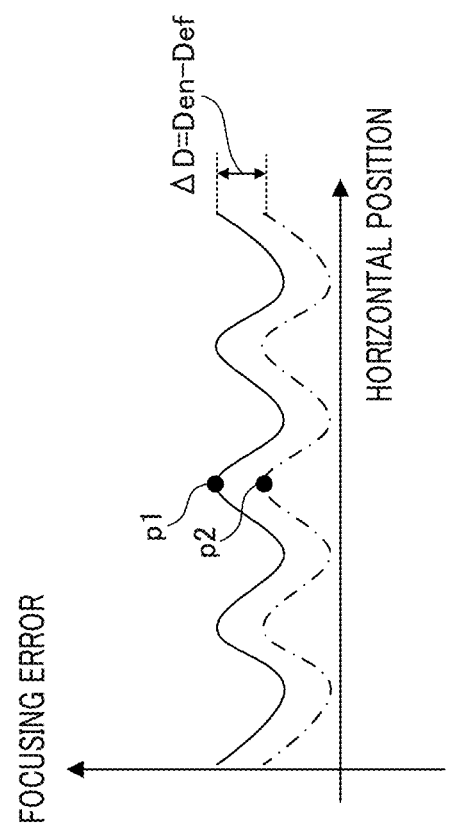
FIGS. 13A and 13B are schematic views for explaining a principle of the second calibration according to the second embodiment.
Figure 13B:
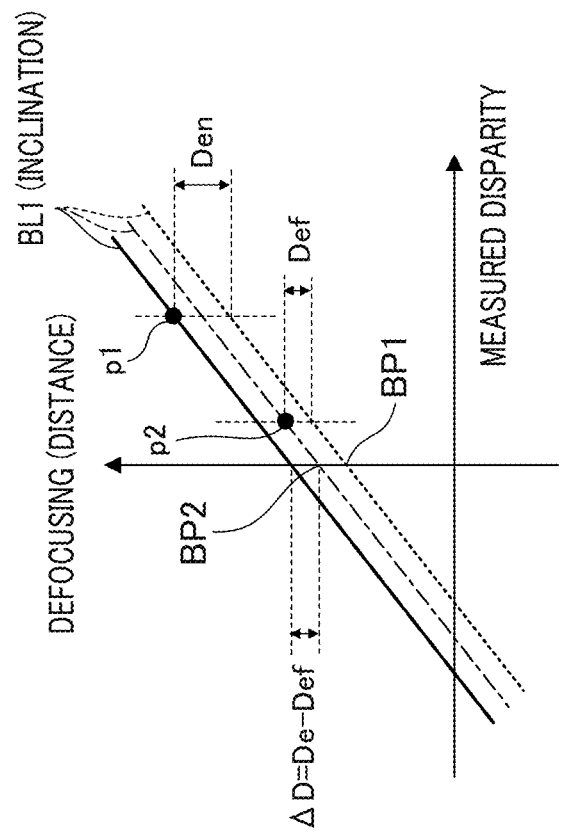

In Step S117, the second correction coefficient is modified by using ΔD. FIGS. 13A and 13B are schematic diagrams for explaining a principle of the second calibration according to the second embodiment. FIG. 13A is different from 10A in that representative defocusing is used as a defocusing value.

p1 and p2 represent values measured under the short-distance condition and the long-distance condition, and a representative defocusing error Den under the short-distance condition and a representative defocusing error Def under the long-distance condition are illustrated in the drawing.

ΔD obtained in Step S116 is De−Def, and if the second correction coefficient is modified on the basis of (Equation 5) below by using ΔD.

$$Dd = BL1 \times d + (BP1 + De - \Delta D) \quad \text{(Equation 5)}$$

If the second correction value after the modification is assumed to be BP2 at this time, BP2=(BP1+De−ΔD) is obtained.

(Equation 5) is a value obtained by uniformly subtracting ΔD from the second correction coefficient BP2 after the modification in the first embodiment. This is visually represented as in FIG. 13B. The solid line indicates error distribution in the horizontal direction under the short-distance condition, and the on-dotted chain line is distribution obtained by shifting the error distribution under the short-distance condition by ΔD as an estimation value under the long-distance condition.

In other words, it is possible to enhance calibration accuracy on the longer distance side by using distribution under the short-distance condition as the defocusing error distribution and using a difference in the representative region 62 under the short-distance condition and the long-distance condition as a base of the distribution.

In this manner, Steps S111 to S117 functions as the second process of acquiring the third and fourth images for calibration, calculating each distance equivalent error value on the basis of the third and fourth-image-for-calibration, and modifying the second correction value on the basis of a difference between the distance equivalent error values.

In the present embodiment, the image for calibration in the long-distance side is acquired, and the second correction value is modified by using the value in the limited representative region in the second calibration in addition to the first embodiment. Since there is no need to use a large object when data for calibration on the long-distance side is used in the second calibration by performing the calibration in this manner, it is possible to improve calibration accuracy on the long-distance side while curbing an increase in size of the calibration environment.

Third Embodiment

Next, a third embodiment of the present invention will be described. In the third embodiment, an image is captured at an increased distance between the camera and the chart for calibration and is used for calculating the calibration value, in addition to the image at a short distance in the second calibration similarly to the second embodiment. The third embodiment is different from the second embodiment in that both the first correction value and the second correction value are modified.

FIG. 14 is a flowchart of the second calibration according to the third embodiment. Note that operations in each step of the flowchart in FIG. 14 are performed by the CPU as a computer in the imaging device executing the computer program stored in the memory.

In Step S141, imaging is performed at an object distance (short-distance condition) where the object-for-calibration 90 appears over the entire image angle to be calibrated, and the object-for-calibration 90 is imaged at a long object distance (long-distance condition) similarly to the second embodiment. In Steps 142 to 145, the representative defocusing error is calculated similarly to the second embodiment.

Figure 15A:
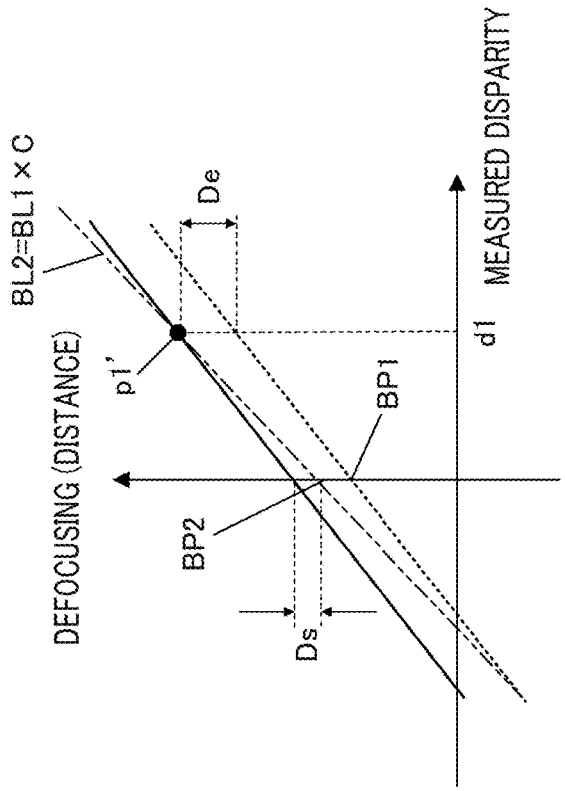
FIGS. 15A to 15C are schematic views for explaining a principle of the second calibration according to the third embodiment.
Figure 15B:
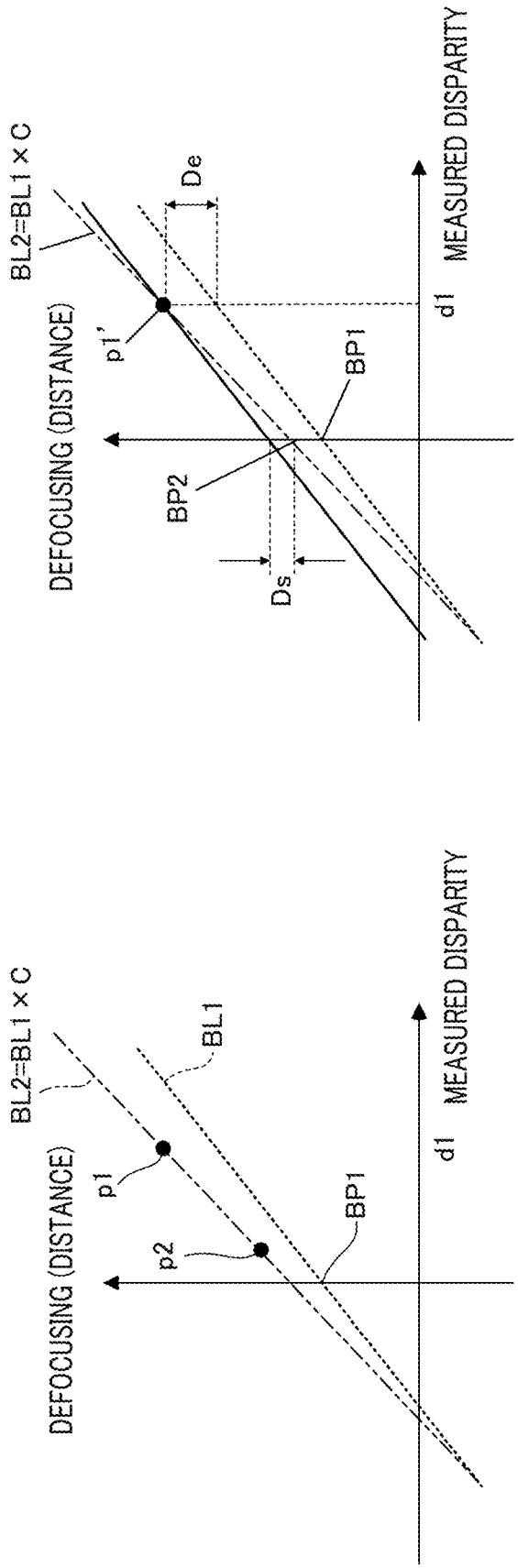
Figure 15C:
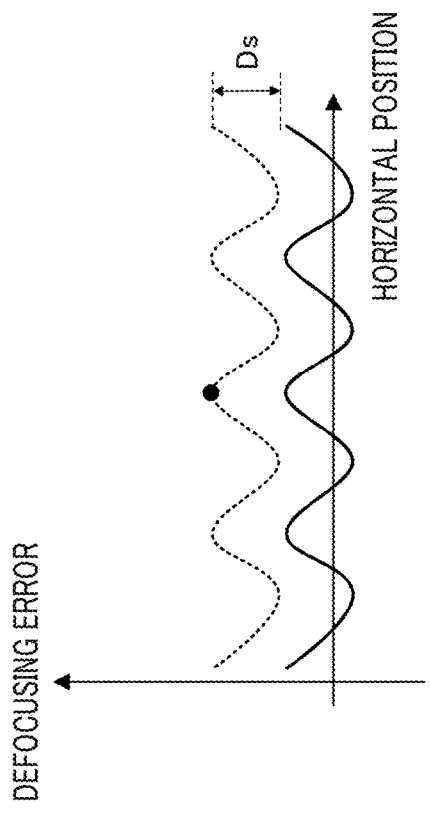

In Step S146, an inclination correction coefficient C is calculated from an inclination of the representative defocusing error in the representative region 62. FIGS. 15A to 15C are schematic diagrams for explaining a principle of the second calibration according to the third embodiment, and the correction coefficient will be described by using FIG. 15A. p1 and p2 illustrate representative defocusing under the short-distance condition and the long-distance condition, respectively. At this time, the dotted line is as illustrated by the two-dotted chain line with a different inclination from that of the first correction coefficient BL1.

At this time, the inclination of the straight line passing through p1 and p2 is represented as C×BL1 by using the inclination correction coefficient C. However, the value BL1 at this time is assumed to be a representative value of BL1 in the representative region. Also, although the inclination has been obtained under the two conditions of p1 and p2 as the points for obtaining the inclination, the inclination may be obtained with higher accuracy by using three or more points for the object distance L.

In Step S147, the first correction coefficient is modified on the basis of (Equation 6) below by using the inclination correction coefficient C.

$$BL2 = C \times BL1 \quad \text{(Equation 6)}$$

Here, BL2 indicates the first correction coefficient after the modification.

In S148, the intercept is calculated from the first correction coefficient BL2 after the modification and the defocusing distribution under the short-distance condition. Description will be given by using FIG. 15B. p1' indicates a defocusing value under the short-distance condition. Ds in the drawing indicates a difference in intercepts between a case where the first correction coefficient BL1 is modified and a case where it is not modified.

At this time, the intercept of the two-dotted chain line can be represented by (Equation 7) below by using the defocusing error De, Ds, and the second correction coefficient BP1.

$$BP2 = BP1 + De - Ds \quad \text{(Equation 7)}$$

Further, (Equation 6) and (Equation 7) can be collectively represented by (Equation 8) below.

$$Dd = C \times BL1 \times d + (BP1 + De - Ds) \quad \text{(Equation 8)}$$

In Step S149, the second correction coefficient is modified by using (Equation 8). In this manner, the third and fourth images for calibration are acquired, the distance equivalent error values are calculated on the basis of each of the third and fourth images for calibration, and the first correction value and the second correction value are modified on the basis of each of the distance equivalent error values in Steps S141 to S149. Therefore, it is possible to improve calibration accuracy in a wide distance range from a short distance to a long distance.

As described above, the image for calibration on the long-distance side is acquired in the second calibration in addition to the first and the second embodiments, and the first correction value and the second correction value are modified by using the values in the limited representative region, in the third embodiment.

Since there is no need to increase the size of the object even if data for calibration on the long-distance side is used in the second calibration, and further, it is possible to modify the inclination component by performing the calibration in this manner, it is possible to improve calibration accuracy in a wider distance range while curbing an increase in size of the calibration environment.

Note that the imaging device 1 as a distance measurement device according to the present embodiment calculates the distance to an object by using disparity between images captured from at least two points of view in ordinary imaging on the basis of the above correction information modified by using the calibration method as described above. Therefore, it is possible to perform distance measurement with high accuracy.

Note that the example where the imaging device is mounted in a moving body such as a vehicle (automobile) has been described in the description of the aforementioned embodiments. However, the moving body in the present embodiment is not limited to a vehicle such as an automobile and may be any moving body that travels, such as a train, a ship, an airplane, a robot, or a drone.

Also, all the functional bocks of the imaging device may not be mounted in the moving body, and a part of the imaging device, for example, the input unit 15, the display unit 16, the image processing unit 13, and the calibration unit 17 may be disposed in a user terminal separated from the moving body.

Although the present invention has been described above in detail on the basis of the preferred embodiments, the present invention is not limited to the above embodiments, various changes can be made on the basis of the gist of the present invention, and these are not excluded from the scope of the present invention.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the distance measurement device or the like through a network or various storage media. Then, a computer (or a CPU, an MPU, or the like) of the distance measurement device or the like may be configured to read and execute the program. In such a case, the program and the storage medium storing the program configure the present invention.

This application claims the benefit of Japanese Patent Application No. 2022-113984, filed on Jul. 15, 2022, which is hereby incorporated by reference herein in its entirety.

What is claimed is:

1. A calibration method for a distance measurement device that is mounted inside a moving body, images outside of the moving body through a transparent body, and calculates a distance to an object by using disparity of images captured from at least two points of view, the method comprising:
    a first process of capturing a first-image-for-calibration and a second-image-for-calibration at different distances between a first-object-for-calibration and the distance measurement device that is not installed inside the moving body without intervention of the transparent body and calculating correction information having a first correction value and a second correction value, for converting disparity information calculated from image information of each of the first-image-for-calibration and the second-image-for-calibration into distance information; and
    a second process of capturing a third-image-for-calibration from a second-object-for-calibration that is located at least at a distance via the transparent body and modifying the correction information calculated in the first process on the basis of image information of at least the captured third-image-for-calibration installing the distance measurement device inside the moving body;
wherein the distance measurement device converts the disparity information into the distance information using a linear function, the first correction value is a first-order coefficient of the linear function, and the second correction value is a zeroth-order coefficient of the linear function.

2. The calibration method for a distance measurement device according to claim 1, wherein the first-object-for-calibration and the second-object-for-calibration have mutually different patterns.

3. The calibration method for a distance measurement device according to claim 2, wherein the first-object-for-calibration has a stripe pattern, and the second-object-for-calibration has a random pattern.

4. The calibration method for a distance measurement device according to claim 1, wherein in the second process, a distance error value is calculated on the basis of the image information of at least the third-image-for-calibration, and the second correction value is modified on the basis of the distance error value calculated on the basis of the image information of at least the third-image-for-calibration.

5. The calibration method for a distance measurement device according to claim 4,
    wherein in the second process, image information of a fourth-image-for-calibration is acquired by imaging the second-object-for-calibration at a distance that is different from that for the third-image-for-calibration, and
    each distance error value is calculated on the basis of image information of each of the third-image-for-calibration and the fourth-image-for-calibration, and the second correction value is modified on the basis of a difference between the distance error values calculated on the basis of the image information of each of the third-image-for-calibration and the fourth-image-for-calibration.

6. The calibration method for a distance measurement device according to claim 4,
    wherein in the second process, image information of a fourth-image-for-calibration is acquired by imaging the second-object-for-calibration at a distance that is different from that for the third-image-for-calibration, and
    each distance error value is calculated on the basis of image information of each of the third-image-for-calibration and the fourth-image-for-calibration, and the first correction value and the second correction value are modified on the basis of the distance error value calculated on the basis of the image information of the third-image-for-calibration and the fourth-image-for-calibration.

7. The calibration method for a distance measurement device according to claim 1, wherein the distance measurement device performs imaging by using an imaging element that includes a first photoelectric conversion unit for receiving a light flux that has passed through a first pupil region, and a second photoelectric conversion unit for receiving a light flux that has passed through a second pupil region.

8. A distance measurement device comprising:
    an imaging unit that is mounted inside a moving body and images outside of the moving body through a transparent body; and
    at least one processor or circuit configured to function as a calculation unit configured to calculate a distance to an object by using disparity between images captured from at least two points of view by the imaging unit, wherein the calculation unit executes:
- a first process of capturing a first-image-for-calibration and a second-image-for-calibration at different distances between a first-object-for-calibration and the imaging unit that is not installed inside the moving body without intervention of the transparent body and calculating correction information having a first correction value and a second correction value, for converting disparity information calculated from image information of each of the first-image-for-calibration and the second-image-for-calibration into distance information using a linear function, the first correction value is a first-order coefficient of the linear function, and the second correction value is a zeroth-order coefficient of the linear function; and
- a second process of capturing a third-image-for-calibration from a second-object-for-calibration that is located at least at one distance via the transparent body and modifying the correction information calculated in the first process on the basis of image information of at least the captured third-image-for-calibration installing the distance measurement device inside the moving body.

9. A non-transitory computer-readable storage medium storing a computer program including instructions for:
- a calculation process of imaging outside a moving body via a transparent body and calculating a distance to an object by using disparity between images captured from at least two points of view by an imaging unit installed in the moving body, wherein the calculation process includes:
- a first process of capturing a first-image-for-calibration and a second-image-for-calibration at different distances between a first-object-for-calibration and the imaging unit that is not installed inside the moving body without intervention of the transparent body and calculating correction information having a first correction value and a second correction value, for converting disparity information calculated from image information of each of the first-image-for-calibration and the second-image-for-calibration into distance information using a linear function, the first correction value is a first-order coefficient of the linear function, and the second correction value is a zeroth-order coefficient of the linear function; and
- a second process of capturing a third-image-for-calibration from a second-object-for-calibration that is located at least at one distance via the transparent body and modifying the correction information calculated in the first process on the basis of image information of at least the captured third-image-for-calibration installing a distance measurement device inside the moving body.

* * * * *